UNITED STATES PATENT OFFICE 2,310,169

VITAMIN B6 INTERMEDIATE

Gustaf H. Carlson, Pearl River, N. Y., assignor to Lederle Laboratories, Inc., New York, N. Y., a corporation of Delaware No Drawing. Application September 26, 1941, Serial No. 412,429

3 Claims. (Cl. 260—297)

This invention relates to new chemical compounds and more particularly relates to an intermediate for use in the preparation of vitamin B6 and to a process of preparing the same.

The compound which I have found to be useful as a vitamin B6 intermediate is that represented by the following formula:

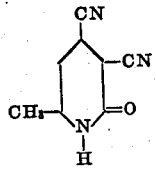

The invention will be illustrated in more detail in conjunction with the following specific examples.

Preparation of the amide of 3-cyano-4-carboxy-6-methyl pyridone-2

Two hundred grams of the ethyl ester of 3-cyano-4-carboxy-6-methyl pyridone-2 (prepared according to the method described by Bardhan, J. C. S., 2223 (1929)) were added to 3.5 liters of absolute methanol saturated at 0° C. with gaseous ammonia and, after 7 days at 0° C., the filtered solution was concentrated in vacuo to a small volume to give the amide of 3-cyano-4-carboxy-6-methyl pyridone-2, which melted above 300° C. with decomposition. The compound so prepared is useful as an intermediate in the synthesis of vitamin B6.

In the foregoing specific example the ethyl ester of 3-cyano-4-carboxy-6-methyl pyridone-2 was employed in carrying out the reaction and is the preferred ester because of its cheapness and availability. It should be understood, however, that the ethyl ester may be replaced by other suitable esters of 3-cyano-4-carboxy-6-methyl pyridone-2. Among the various esters that may be employed are the alkyl esters such as methyl, propyl, amyl, hexyl, and the like. The aromatic esters, such as phenyl and naphthyl, may similarly be employed. Esters of the aralkyl type which may be satisfactory are those such as the benzyl ester and the ester of 2-hydroxymethylnaphthalene, cinnamyl alcohol, etc. The esters derived from cycloaliphatic alcohols such as cyclohexanol, methyl cyclohexanol, fenchol, or fenchyl alcohol may be employed. The use of the various other esters such as those derived from heterocyclic alcohols, for example furfuryl alcohol, tetrahydrofurfuryl alcohol or those derived from nitro alcohols such as 2-nitro-2-methyl-1-propanol are not precluded from the present invention.

Preparation of 3,4-dicyano-6-methyl pyridone-2

Dehydration of the amide of 3-cyano-4-carboxy-6-methyl pyridone-2 was effected by treatment with phosphorous oxychloride, both without the use of a solvent and in hot toluene solution. The details of a typical experiment in which no solvent was used are given herewith. The amide (2 g.) and 25 cc. of phosphorous oxychloride were heated in a bath at 145–150° C. for 50 minutes, excess phosphorous oxychloride was distilled in vacuo and the residue was treated with 50 g. of cracked ice. The crystalline product was filtered off and recrystallized from aqueous alcohol. The pure dinitrile (0.4 g.) melted at 241–243° C. (uncorrected).

In subsequent experiments it was found to be advantageous to employ an inert diluent in the reaction mixture and typical of such a dehydration are the following details. A mechanically stirred mixture of 50 g. of the amide, 250 cc. of dry toluene and 250 cc. of phosphorous oxychloride was heated in a bath at 130–135° C. for 9.5 hours and, after 15 hours at room temperature, the undissolved material was filtered off and thoroughly extracted with toluene and ether. The solid was then extracted with acetone and yielded 8.9 g. of unchanged amide. The original toluene filtrate and the combined toluene and ether extracts were evaporated in vacuo and the residual product was treated with 20 cc. of ice-water. The crude yellow mixture was diluted with 800 cc. of hot acetone, the insoluble product was filtered off, twice extracted with 300 cc. of hot acetone and yielded 11.3 g. of recovered amide. The aqueous acetone filtrate and the combined acetone extracts were concentrated in vacuo to a small volume and yielded 13.4 g. of the crude dinitrile (M. P. 239–243° C.) which melted at 241–242° C. after recrystallization (melting points uncorrected).

The reaction which takes place in the processes may be represented as follows:

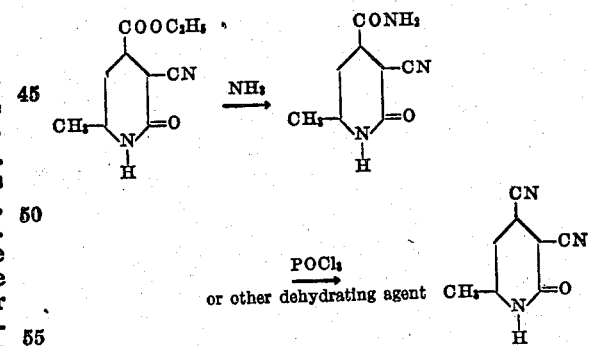

Phosphorous oxychloride is the preferred dehydrating reagent in carrying out the above reaction. It should be understood, however, that any other suitable dehydrating agent may be employed. Similarly, various other inert solvents may be used to replace toluene.

I claim:

1. The process which comprises dehydrating the amide of 3-cyano-4-carboxy-6-methyl pyridone-2 to produce 3,4-dicyano-6-methyl pyridone-2.

2. The process which comprises dehydrating the amide of 3-cyano-4-carboxy-6-methyl pyridone-2 by treatment with phosphorous oxychloride to produce 3,4-dicyano-6-methyl pyridone-2.

3. The compound of the formula:

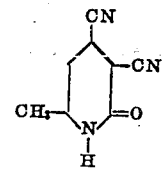

GUSTAF H. CARLSON.